United States Patent
Joi et al.

(10) Patent No.: US 10,692,027 B2
(45) Date of Patent: Jun. 23, 2020

(54) CONFIDENTIALITY PROTECTION FOR SURVEY RESPONDENTS

(71) Applicant: Workplace Dynamics, LLC, Exton, PA (US)

(72) Inventors: Richard Johnson Joi, Lancaster, PA (US); Anthony Douglas Moquin, Glenmoore, PA (US); Douglas J. Claffey, Malvern, PA (US); Mark Daniel Suwyn, Savannah, GA (US); John W. Quillen, Jr., Malvern, PA (US)

(73) Assignee: ENERGAGE, LLC, Exton, PA (US)

( * ) Notice: Subject to any disclaimer, the term of this patent is extended or adjusted under 35 U.S.C. 154(b) by 495 days.

(21) Appl. No.: 14/931,985

(22) Filed: Nov. 4, 2015

(65) Prior Publication Data

US 2016/0125334 A1    May 5, 2016

Related U.S. Application Data

(60) Provisional application No. 62/075,097, filed on Nov. 4, 2014.

(51) Int. Cl.
  *G06Q 10/00* (2012.01)
  *G06Q 10/06* (2012.01)
(52) U.S. Cl.
  CPC .............. *G06Q 10/06312* (2013.01)
(58) Field of Classification Search
  None
  See application file for complete search history.

(56) References Cited

U.S. PATENT DOCUMENTS

| 5,878,214 A | 3/1999 | Gilliam et al. |
| 6,853,975 B1 | 2/2005 | Dirksen et al. |

(Continued)

FOREIGN PATENT DOCUMENTS

EP   1052587   2/2002

OTHER PUBLICATIONS

LinChiat Chang and Jon A. Krosnick (National Surveys Via RDD Telephone Interviewing vs. the Internet: Comparing Sample Representativeness and Response Quality, Dec. 2008). (Year: 2008).*

(Continued)

*Primary Examiner* — Hafiz A Kassim
(74) *Attorney, Agent, or Firm* — Belles Katz LLC

(57) ABSTRACT

In one embodiment, the invention can be a method of protecting confidentiality in a real-time survey, the method including receiving from each of a plurality of organization respondents a real-time response to a survey topic; receiving an indication of an organizational change affecting a first member of the organization, the organizational change comprising the first member departing or joining a first department, the first department comprising a plurality of first department respondents, the plurality of first department respondents being a first subset of the plurality of organization respondents; defining a first safe group comprising a first subset of the plurality of first department respondents, the first safe group having first safe group responses to the survey topic; and providing a response report for at least the first department, the response report excluding the first safe group responses.

20 Claims, 12 Drawing Sheets

(56) References Cited

U.S. PATENT DOCUMENTS

| | | | |
|---|---|---|---|
| 7,383,200 B1 | 6/2008 | Walker et al. | |
| 7,392,197 B1* | 6/2008 | Fliess | G06Q 10/10 |
| | | | 705/319 |
| 7,552,063 B1* | 6/2009 | McEachern | G06Q 30/02 |
| | | | 705/3 |
| 7,593,861 B2 | 9/2009 | Morrel-Samuels | |
| 7,720,737 B2* | 5/2010 | D'Alessandro | G06Q 10/0639 |
| | | | 705/12 |
| 7,823,207 B2 | 10/2010 | Evenhaim | |
| 8,195,497 B2 | 6/2012 | Montgomery | |
| 8,266,534 B2 | 9/2012 | Curtis et al. | |
| 8,392,962 B2* | 3/2013 | Grason | G06F 16/958 |
| | | | 726/2 |
| 8,560,478 B1 | 10/2013 | DeSpain | |
| 8,572,019 B2 | 10/2013 | Eggers et al. | |
| 8,781,884 B2 | 7/2014 | O'Shea, Jr. et al. | |
| 8,935,312 B2 | 1/2015 | Gartner et al. | |
| 2002/0161611 A1 | 10/2002 | Price et al. | |
| 2002/0188777 A1* | 12/2002 | Kraft | G06Q 10/10 |
| | | | 710/100 |
| 2003/0004967 A1* | 1/2003 | Calderaro | G06Q 10/06 |
| 2003/0078804 A1* | 4/2003 | Morrel-Samuels | |
| | | | G06Q 10/0639 |
| | | | 705/7.42 |
| 2004/0225577 A1 | 11/2004 | Robinson | |
| 2004/0267794 A1* | 12/2004 | Might | G06Q 10/10 |
| 2005/0060219 A1 | 3/2005 | Deitering et al. | |
| 2005/0075922 A1* | 4/2005 | Brady | G06Q 30/02 |
| | | | 705/7.32 |
| 2005/0125246 A1 | 6/2005 | Muller et al. | |
| 2005/0130110 A1* | 6/2005 | Gosling | G09B 7/00 |
| | | | 434/322 |
| 2006/0074708 A1* | 4/2006 | Woods | G16H 10/20 |
| | | | 705/2 |
| 2006/0117318 A1* | 6/2006 | Rumelhart | G06F 9/5038 |
| | | | 718/104 |
| 2006/0173785 A1 | 8/2006 | Behbehani | |
| 2006/0242154 A1* | 10/2006 | Rawat | G06F 17/30126 |
| 2007/0136237 A1 | 6/2007 | Barker et al. | |
| 2007/0168247 A1* | 7/2007 | Robbins | G06Q 10/00 |
| | | | 705/7.32 |
| 2007/0174108 A1* | 7/2007 | Monster | G06Q 10/107 |
| | | | 705/7.32 |
| 2007/0271337 A1 | 11/2007 | Olson | |
| 2008/0015927 A1* | 1/2008 | Ramirez | G06Q 10/06395 |
| | | | 705/7.29 |
| 2008/0027783 A1 | 1/2008 | Hughes et al. | |
| 2008/0147706 A1 | 6/2008 | Anglin et al. | |
| 2009/0024663 A1* | 1/2009 | McGovern | G06F 21/577 |
| 2009/0254572 A1* | 10/2009 | Redlich | G06Q 10/06 |
| 2009/0327434 A1* | 12/2009 | Reynolds | G06Q 30/02 |
| | | | 709/206 |
| 2010/0023377 A1* | 1/2010 | Sheridan | G06Q 10/10 |
| | | | 705/7.32 |
| 2010/0145765 A1* | 6/2010 | Kantarek | G06Q 30/02 |
| | | | 705/7.32 |
| 2010/0169136 A1* | 7/2010 | Kho | G06Q 10/06 |
| | | | 705/319 |
| 2010/0262466 A1* | 10/2010 | Smith | G06Q 10/00 |
| | | | 705/7.36 |
| 2011/0270650 A1 | 11/2011 | Pavagadhi et al. | |
| 2011/0307303 A1* | 12/2011 | Dutta | G06F 17/30539 |
| | | | 705/7.42 |
| 2012/0047000 A1* | 2/2012 | O'Shea et al. | G06Q 30/0203 |
| | | | 705/7.32 |
| 2013/0117060 A1 | 5/2013 | Henriksen et al. | |
| 2013/0198815 A1* | 8/2013 | Piliouras | H04L 63/10 |
| | | | 726/4 |
| 2013/0297373 A1* | 11/2013 | Proux | G06Q 10/105 |
| | | | 705/7.28 |
| 2014/0040161 A1 | 2/2014 | Berlin | |
| 2014/0100922 A1* | 4/2014 | Aycock | G06Q 10/0639 |
| | | | 705/7.38 |
| 2014/0143025 A1* | 5/2014 | Fish | G06Q 10/06 |
| | | | 705/7.42 |
| 2014/0258421 A1 | 9/2014 | Langhorst et al. | |
| 2014/0278782 A1 | 9/2014 | Damerdji et al. | |
| 2014/0278783 A1* | 9/2014 | Du | G06O 30/0203 |
| | | | 705/7.32 |
| 2015/0095112 A1* | 4/2015 | Micewicz | G06Q 10/10 |
| | | | 705/7.32 |
| 2015/0134694 A1 | 5/2015 | Burke et al. | |

OTHER PUBLICATIONS

Chen, Ying-Chang, Ching Kuo, Wang ,Wen Cheng, and Hwa Hsia (Structural Investigation of the Relationship between Working Satisfaction and Employee Turnover, The Journal of Human Resource and Adult Learning vol. 6, No. 1, Jun. 2010)). (Year: 2010).*

An Agenda App for an IPad, http://agendasapp.com.

Employee Engagement Surveys, Qualtrics, http://qualtrics.com/employee-engagement/.

KickStart Alliance Interactive Meetings Exponential Results, http://www.kickstartall.com/resources/archives/interactive-meetings-exponential-results/.

References cited in Non Final Office Action dated Jul. 23, 2018 in corresponding U.S. Appl. No. 14/931,999. US.

An Oracle Best Practice Guide (Best Practices for Improving Survey Participation, Mar. 2012). (Year: 2012).

Alexis Arnold (An Organizational Assessment of Motivation and Performance in the Workplace, Spring 2008). (Year: 2008).

* cited by examiner

CONFIDENTIALITY PROTECTION FOR SURVEY RESPONDENTS

CROSS REFERENCE TO RELATED APPLICATIONS

The present application claims priority to U.S. Provisional Patent Application No. 62/075,097 filed Nov. 4, 2014, the entirety of which is incorporated herein by reference.

BACKGROUND

Surveys can help an organization to better understand its members. Such surveys generally ask members to provide anonymous answers regarding topics such as engagement, organizational health, and satisfaction. The feedback provided by surveys can help an organization diagnose problems and find new opportunities for improvement.

When an organization member leaves or joins a department, a resulting change to the department's aggregate survey results can compromise the confidentiality of the responses of the old or new member. This is especially an issue for real-time survey systems, where changes to survey results can be seen almost immediately. What is needed is a survey system that can better protect the confidentiality of those responding to the survey.

BRIEF SUMMARY

The present disclosure is directed to a method, system, and storage medium for protecting confidentiality in a real-time survey. In one aspect, a method includes receiving from each of a plurality of organization respondents a real-time response to a survey topic; receiving an indication of an organizational change affecting a first member of the organization, the organizational change comprising the first member departing or joining a first department, the first department comprising a plurality of first department respondents, the plurality of first department respondents being a first subset of the plurality of organization respondents; defining a first safe group comprising a first subset of the plurality of first department respondents, the first safe group having first safe group responses to the survey topic; and providing a response report for at least the first department, the response report excluding the first safe group responses.

In another aspect, a system includes a) respondent devices of first department respondents to a survey topic, wherein i) each of the first department respondents belongs to a first department; ii) each of the respondent devices is configured to execute a first instance of a survey application; and iii) the first instance of the survey application is configured to receive from each of the first department respondents a real-time response to the survey topic; b) a first member device of a first member of the first department; c) a manager device of a manager of the first department; and d) a server configured to i) receive an indication of an organizational change affecting the first member, the organizational change comprising the first member departing the first department; ii) define a safe group comprising a subset of the first department respondents; and iii) hide the responses of the safe group from the manager of the first department.

In yet another aspect, a non-transitory computer-readable storage medium encoded with instructions which, when executed on a processor, performs a method that includes receiving from each of a plurality of organization respondents a response to a survey topic; receiving an indication of an organizational change affecting a first member of the organization, the organizational change comprising the first member departing or joining a first department, the first department comprising a plurality of first department respondents, the plurality of first department respondents being a first subset of the plurality of organization respondents; defining a first safe group comprising a first subset of the plurality of first department respondents, the first safe group having first safe group responses to the survey topic; and providing a response report for at least the first department, the response report excluding the first safe group responses.

BRIEF DESCRIPTION OF THE DRAWINGS

The invention of the present disclosure will become more fully understood from the detailed description and the accompanying drawings, wherein.

DETAILED DESCRIPTION

Figure 1:
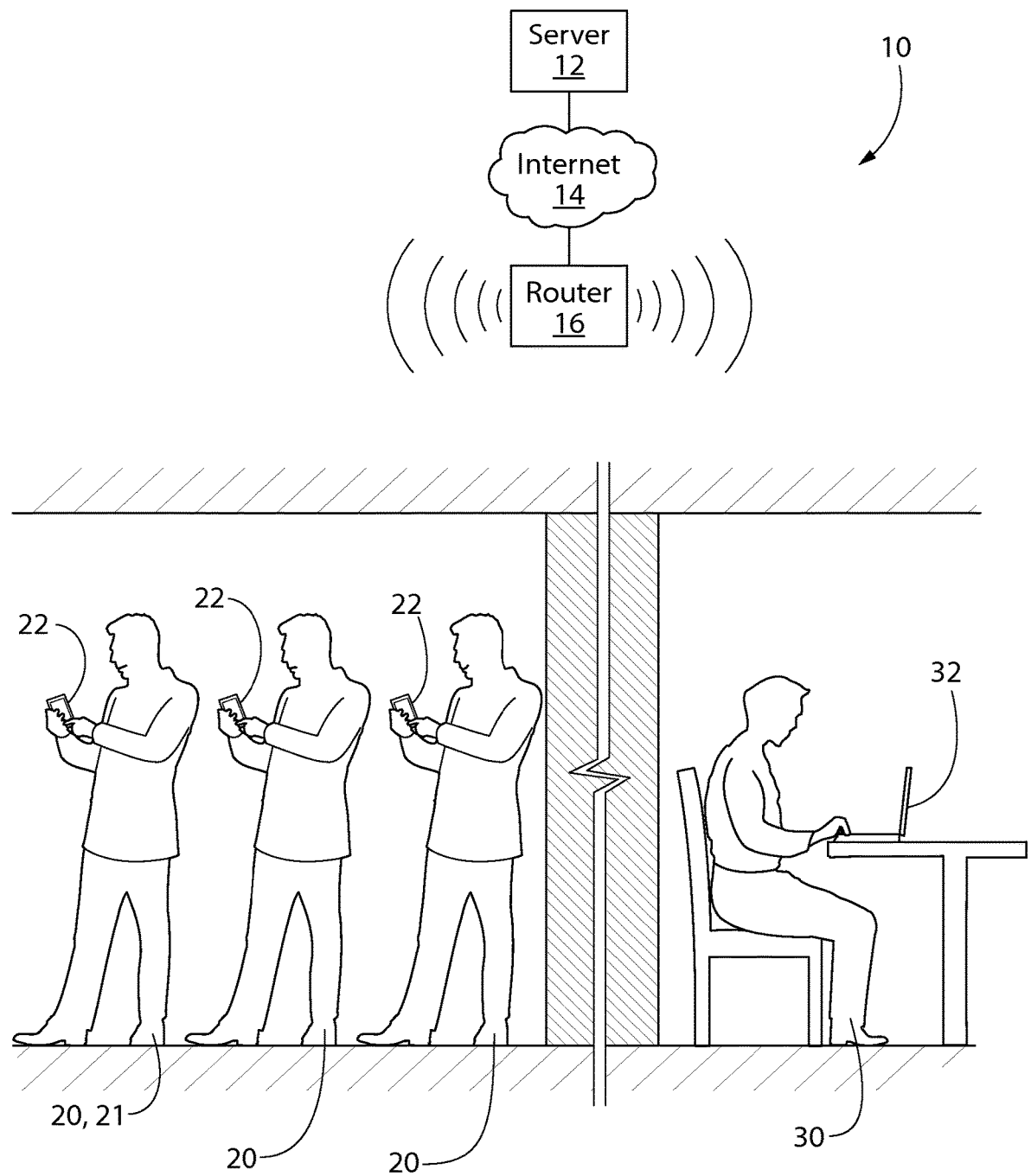
FIG. 1 is a block diagram of a system according to one embodiment of the present invention.

The following description of the preferred embodiment(s) is merely exemplary in nature and is in no way intended to limit the invention. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. The discussion herein describes and illustrates some possible non-limiting combinations of features that may exist alone or in other combinations of features.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g. code). Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring now to FIG. 1, a block diagram of a system 10 according to one embodiment of the present invention is shown. The exemplified system 10 includes a server 12 and router 16 connected to the internet 14, as well as respondent devices 22 and a manager device 32. The respondent devices 22 belong to department respondents 20, that is, members of a department of an organization 23 that have responded to a survey topic. A department can be any collection of members of an organization 23, and a member of an organization can be any person affiliated with the organization, including employees, contractors, and non-paid volunteers. In the exemplified embodiment, the department respondents include a first member 21 of the organization 23 having a respondent device 22.

The manager device 32 belongs to a manager 30 within the organization 23. The manager 30 can be any member of the organization 23 that has authority to assess the performance of other members of the organization 23. The manager 30 may also have authority to generate new survey topics for response. In the exemplified embodiment, the manager 30 has authority to assess the performance of the department respondents 20.

In the exemplified embodiment, the system can enable a manager 30 to provide survey topics in real-time, and to receive responses in real-time. For example, after a meeting, a manager can immediately send a survey question to the participants in the meeting (e.g., "How was the meeting?"), and can view the responses in a response report that updates in real-time as the survey responses are received. As used herein, the term real-time is understood to mean immediately or substantially immediately (e.g., within seconds). In other embodiments, the method can use less rapid communications.

The server 12 can be any computer or processor (or collection thereof) for carrying out programs in accordance with the functions described herein. In the exemplified embodiment, the server 12 communicates with the respondent and manager devices 22, 32 through an internet connection, the router 16 providing wireless internet connection to the respondent and manager devices 22, 32. In other embodiments, the server 12 can communicate with the respondent and manager devices 22, 32 through any standard communication means, including through use of a telecommunication network (e.g., 3G or 4G) or a wired internet connection (e.g., wired Ethernet cables).

Figure 2:
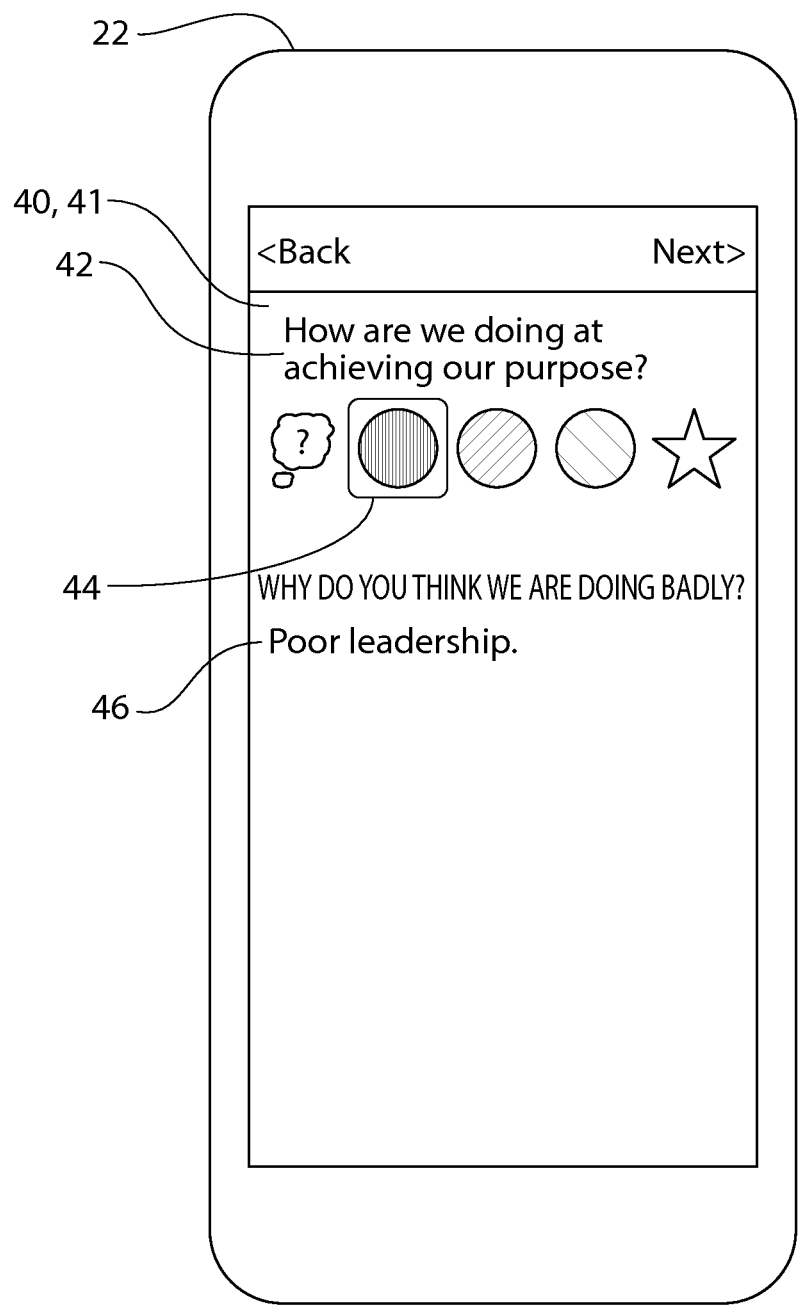
FIG. 2 is an image of a respondent user interface of a respondent device according to one embodiment of the present invention.

FIG. 2 is an image of a respondent user interface 41 of a respondent device 22 where a respondent posts a response according to one embodiment of the invention. In the exemplified embodiment, the respondent device 22 is a mobile smartphone. In other embodiments, the respondent device 22 can be any computer device capable of carrying out programs in accordance with the functions described herein (including laptop computers, desktop computers, and tablets).

The user interface 41 of the respondent device 22 shows a first instance of a survey application 40. In the exemplified embodiment, the survey application 40 is a smartphone application. In other embodiments, the survey application 40 can be any program for carrying out the functions described herein. The respondent device 22 provides the respondent user interface 41. In the exemplified embodiment, the user interface 41 utilizes a touch screen provided by the smartphone. In other embodiments, the user interface can be any user interface capable of enabling a user to communicate with and carry out the functions described herein, including an interface utilizing a computer monitor, mouse, and/or keyboard.

The respondent user interface 41 shows a survey topic 42, namely, "How are we doing at achieving our purpose?" The survey topic 42 can be any question or topic for which a respondent can provide a response or rating. The respondent user interface 41 provides options for a response 44. In the exemplified embodiment, there are five rating options to choose from (from left to right): a question cloud, a red circle, an amber circle, a green circle, and a star. These options represent different ratings of how the company is doing regarding achieving the organization's purpose. In the exemplified embodiment, the question cloud represents the No Answer response, which can be described as follows: "I don't care. I can't decide. I don't understand. My feedback won't matter. I'm worried about being honest. Or, this isn't applicable to me." The red circle represents the Bad rating, which can be described as follows: "There are significant problems that need to be dealt with urgently." The yellow circle represents the Needs Improvement rating, which can be described as follows: "There are obvious and valuable improvements that can be made." The green circle represents the Good rating, which can be described as follows: "Nothing's perfect, but we are doing well overall." Finally, the star represents the Exceptional rating, which can be described as follows: "We are doing better here at achieving our purpose than anywhere else I know of." In the exemplified embodiment, the red option has been chosen as the response 44. In other embodiments, other rating options having other meanings can be available.

In the exemplified embodiment, the respondent is also asked to comment on why the chosen response 44 was given. In this embodiment, the respondent can provide an unstructured written comment 46. In the exemplified embodiment, the respondent states the organization has "Poor leadership." In other embodiments, structured responses (e.g., a list of possible explanations) can be provided for selection and/or unstructured responses can be eliminated.

In the exemplified embodiment, the response to the survey topic is the response 44 that provides a rating. In other embodiments, however, the response can refer to any other type of response to a survey topic or question, such as comment 46.

Figure 3:
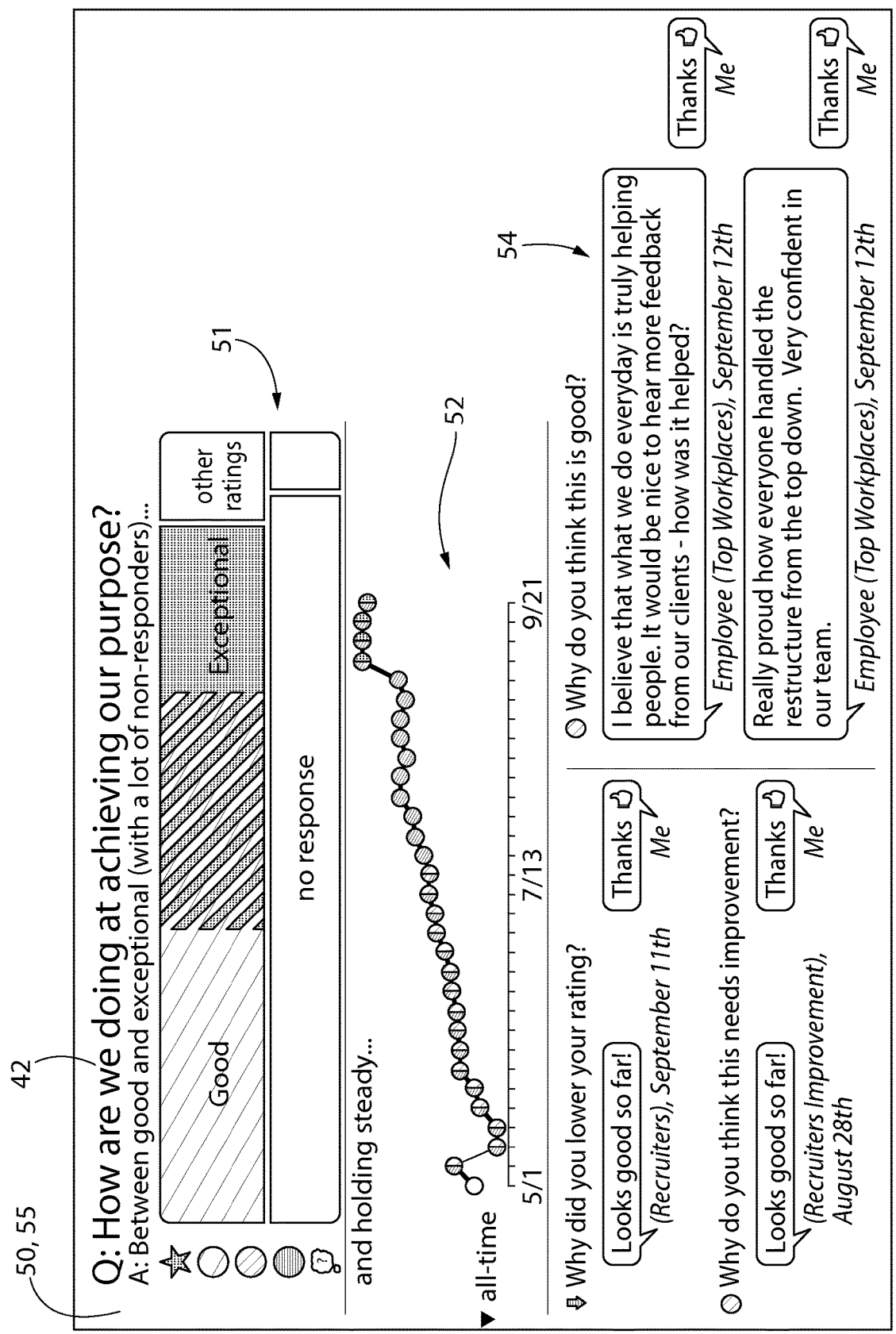
FIG. 3 is an image of a manager user interface of a manager device according to one embodiment of the present invention.

FIG. 3 is an image of a manager user interface 55 of a manager device according to one embodiment of the present invention. In the exemplified embodiment, the manager device 32 (shown in FIG. 1) is a laptop computer. In other embodiments, the device 22 can be any computer device capable of carrying out programs in accord with the functions described herein (including desktop computers, smartphones, and tablets).

In the exemplified embodiment, the second instance of the survey application 50 is a computer program running on the manager device. In other embodiments, the second instance of the survey application can be any program for carrying out the functions described herein. In the exemplified embodiment, the user interface 55 utilizes a keyboard, touchpad, and screen as part of a laptop computer. In other embodiments, the user interface can be any user interface capable of enabling a user to communicate with and carry out the functions described herein.

The second instance of the survey application 50 enables the manager to view a response report 56. The response report 56 can be any description of the responses to a survey. In the exemplified embodiment, the response report 56 shows first department survey results for the survey topic 42 indicated at the top of the manager user interface 55. The response report includes a first response summary 51, a second response summary 52, and a comment summary 54.

The first response summary 51 uses area to represent how the respondents in the displayed department responded to the displayed topic. This summary 51 focuses attention on the large groups of identical answers and de-emphasizes outlying responses. This helps protect confidentiality and helps leaders to focus on the big picture and not minor issues. A written description of the response summary is also provided ("Between good an exceptional (with a lot of non-responders) . . . ").

The second response summary 52 is a timeline chart. This summary 52 displays small circles that summarize the state of the responses to the displayed topic 42 at various moments in time. The gaps between the options are calculated by assigning a probability-based logit score to each of the four scale values and then averaging together all of the responses. A color summary is also used to communicate the practical differences between the items.

In the comment summary 54, comments are displayed with a byline that varies based on the chosen confidentiality preferences of the person that made the comment. In the exemplified embodiment, each member can choose a default confidentiality level. Non-limiting examples of chosen default confidentiality levels are Fearless, A Little Worried, and Scared. The level chosen will help control the amount of confidentiality provided to a member when the member submits a response or comment. For example, when a member is an employee submitting a comment, the employee can be identified by the employee's name, as an employee of a certain department, as an employee of a larger department, or simply as an employee of the company, depending on the level of anonymity desired.

Figure 4:
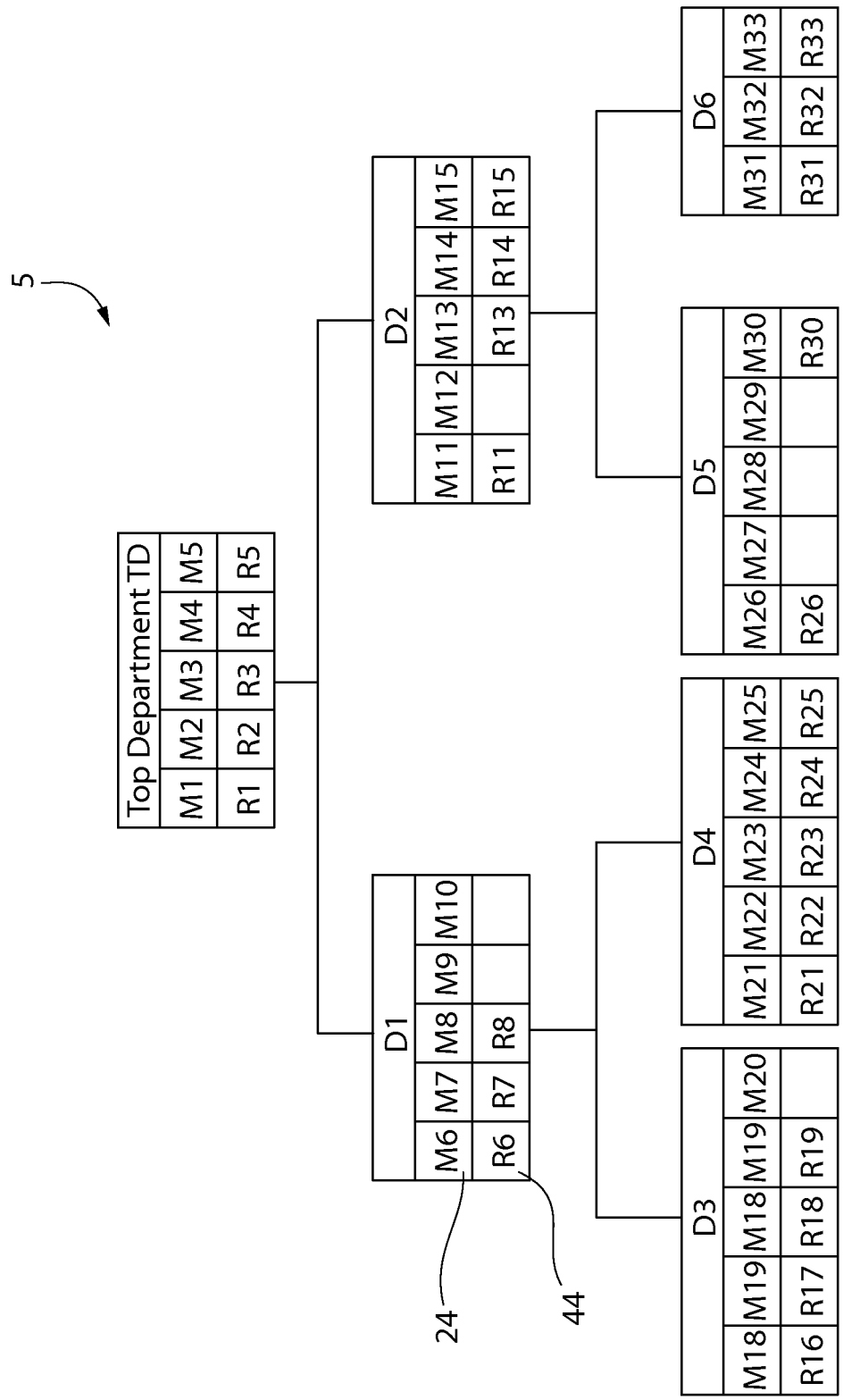
FIG. 4 is a block diagram of a hierarchy according to one embodiment of the present invention.

FIG. 4 is a block diagram of a hierarchy 5 according to one embodiment of the present invention. Department D3 has members M16-M20 and department D4 has members M21-M25. Departments D3 and D4 report to department D1, which has members M6-M10. Department D1 reports to the top department TD, which has members M1-M5. Department D5 has members M26-M30 and department D6 has members M31-M33. Departments D5 and D6 report to department D2, which has members M11-M15. Department D2 reports to the top department TD. Organization respondents 24 are those members that have submitted a response 44 to a survey topic. For example, member M6 of department D1 is an organization respondent 24 that has submitted response R6 44. In the exemplified embodiment, the department D1 respondents are M6, M7, and M8. A manager can see responses from members of the manager's department, as well members in departments that are descendants to the given manager's department (below the department manager's department in the hierarchy). Thus, the manager of the top department TD can see responses from any of the members in departments TD and D1-D6, and the manager of D1 can see responses from any of the members of departments D1, D3, and D4. Similar hierarchies are shown in subsequent figures.

Figure 5A:
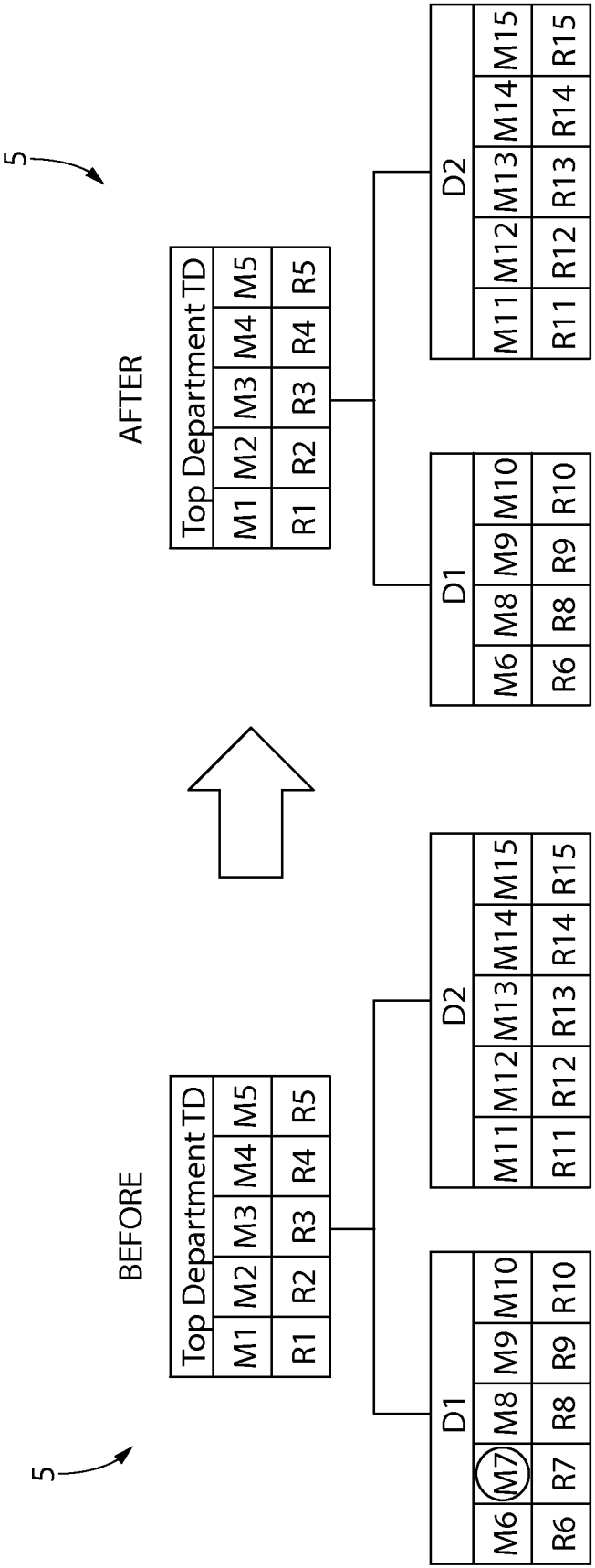
FIG. 5A is a block diagram of a hierarchy before and after a member leaves an organization without confidentiality protection according to one embodiment of the present invention.

FIG. 5A is a block diagram of a hierarchy 5 before and after a first member M7 leaves an organization without confidentiality protection according to one embodiment of the present invention. The departure of first member M7 is a type of organizational change. An organizational change can refer to various organizational changes, such as the departure of or addition of a member, or movement of a member from one department to another.

The first member M7 is a member of a first department D1. In first department D1, all members M6-M10 have provided responses R6-R10 to the survey topic. Thus, all of the first department members M6-M10 are first department respondents. The first member M7 has chosen a confidentiality level of Fearless. In the exemplified embodiment, when a member chooses a confidentiality level of fearless, the confidentiality protections discussed below are not triggered. Rather, after the first member M7 leaves the organization, the first member M7 and his response R7 are simply removed from the hierarchy. If the response R7 of the first member M7 was negative, a manager such as M5 may note a change in to a department D1 response report. For example, if response R7 was negative, a manager may notice that the D1 response report showed more positive ratings after member M7 department, thereby indicating to the manager that the first member M7 was the source of a negative response.

Figure 5B:
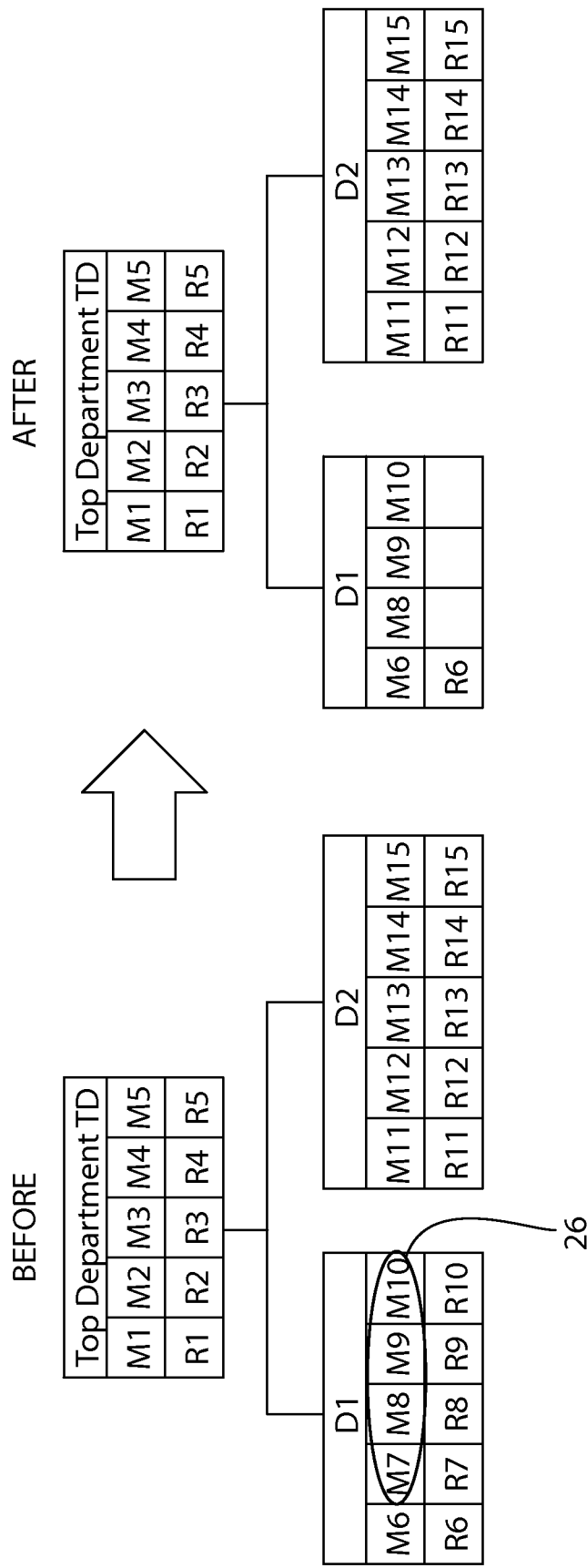
FIG. 5B is a block diagram of a hierarchy before and after a member leaves an organization with confidentiality protection according to one embodiment of the present invention.

FIG. 5B is a block diagram of a hierarchy 5 before and after a first member M7 leaves an organization with confidentiality protection according to one embodiment of the present invention. The first member M7 is a member of a first department D1. In the first department D1, all members M6-M10 have provided responses R6-R10 to the survey topic. Thus, all first department members M6-M10 are first department respondents. The first member M7 has chosen a confidentiality level of A Little Worried. In this embodiment, selection of such a confidentiality level ensures that, after the first member M7 leaves the organization, the system will provide special protections for the confidentiality of the first member M7.

To provide such confidentiality, a first safe group 26 is created. In the exemplified embodiment, the safe group 26 comprises four respondents from the department D1 of the first member M7. Specifically, the safe group 26 comprises first member M7 and members M8-M10. As is shown, after the organizational change, the responses R7-R10 of the safe group 26 are expired. With these responses expired, a response report for department D1 will not include responses R7-R10. Thus, a manager such as M5 comparing before and after response reports for department D1 will have little ability to determine what changes to the responses were caused by the departure of first member M7. A safe group can be any group of members whose responses are expired for excluding the responses of the safe group members from a response report, and can include or exclude the first member (whether or not the first member has provided a response).

In the exemplified embodiments of FIGS. 5A and 5B, the size of the safe group is determined by the general confidentiality level chosen by the first member 21. If Fearless is chosen, the safe group size is one, thus providing no significant confidentiality protection. If A Little Worried or Scared is chosen, the safe group size is four. The invention is not so limited. In other embodiments, the safe group size can be any number and can be determined based on other factors, such as a safe group size chosen by the first member, or by a predetermined number. Further, in the exemplified embodiment, the first member, when a respondent, is part of the safe group. In other embodiments, a safe group can exclude a respondent (or non-respondent) first member. Further, safe groups can be of the same or a different number.

Figure 6:
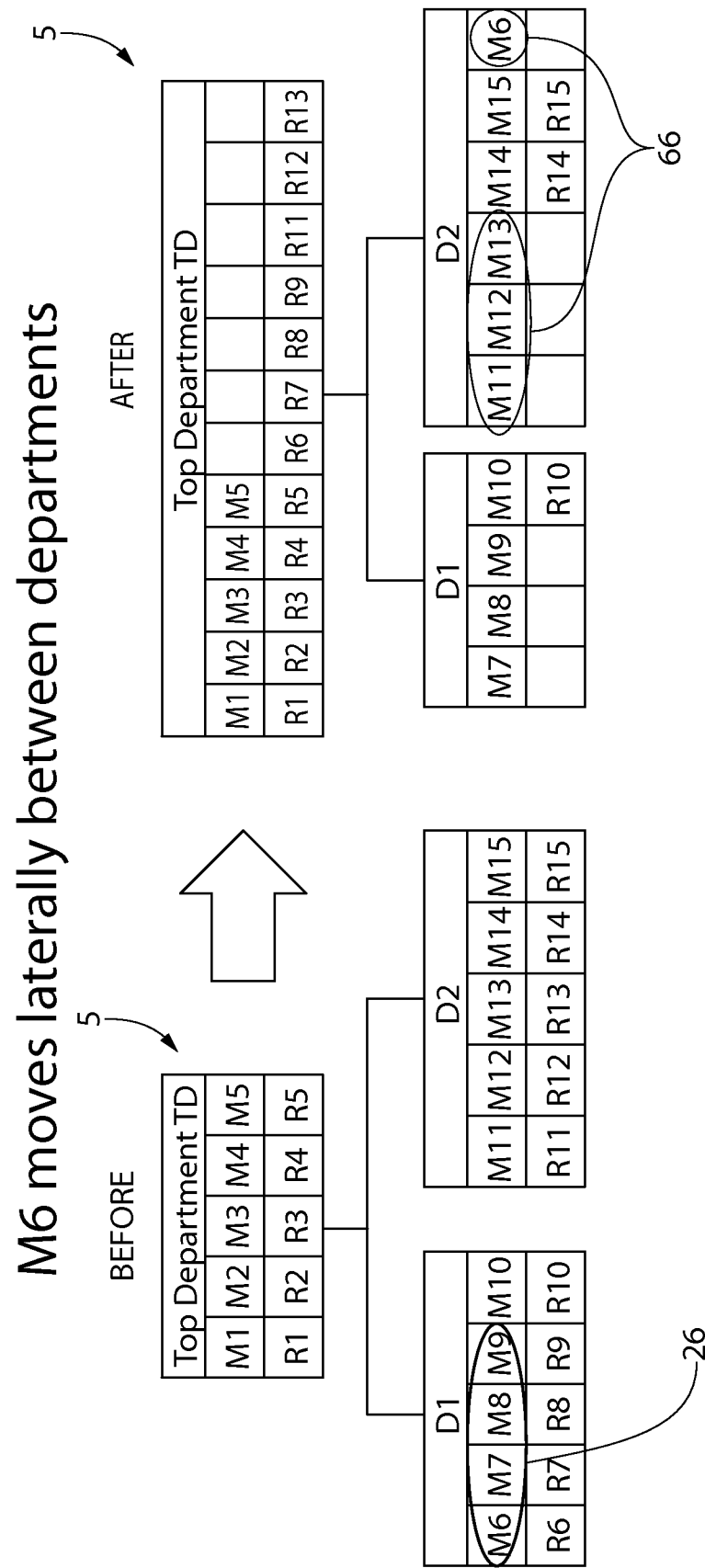
FIG. 6 is a block diagram of a hierarchy before and after a responding member moves laterally within an organization according to one embodiment of the present invention.

FIG. 6 is a block diagram of a hierarchy 5 before and after a member moves laterally within an organization according to one embodiment of the present invention. The hierarchy 5 before the lateral movement is similar to that of FIG. 5B, with first member M6 belonging to first department D1, and departments D1 and D2 reporting to top department TD. An organizational change occurs such that first member M6 is moved from first department D1 to second department D2. In this embodiment, a first safe group 26 has four members, namely, first member M6 and respondents M7-M9. The responses R6-R9 of these respondents are expired after the organizational change. Further, a second safe group 66 having four members is defined. This second safe group 66 includes member M6 and respondents M11-M13. The responses R11-R13 of these respondents are expired. By creating these safe groups 26, 66, the confidentiality of the first member M6 21 is once again protected for purposes of D1 response reports and D2 response reports. That is, a manager viewing before and after response reports for departments D1 or D2 would not be able to infer the response R6 of first member M6.

In this embodiment, the responses R6-R9 and R11-13 are not simply expired, but are also recreated in the Top Department. Thus, while a response report on first department D1 alone, or a response report on second department D2 alone, will not include the responses of the first safe group or second safe group (the responses are expired with respect to these response reports), a report on a larger scope (such as a report on the organization as a whole) would include the expired responses R6-R9 and R11-R13. In the exemplified embodiment, the only departments that see an impact to their response reports are the first and second departments D1, D2, since their membership changed. From the perspective of top department TD, however, membership did not change.

In this embodiment, when members move laterally within an organizational hierarchy, the safe group responses are recreated in the nearest common ancestor scope (NCAS). For a lateral organizational change, the NCAS is the deepest scope in the hierarchy that includes both the original department (source scope) and the new department (target scope) as descendants within the hierarchy. In the current example, the NCAS is the top department. The safe group responses are recreated in the NCAS because this scope will have the same hierarchical membership, and therefore its reports need not be impacted by the organizational change.

A scope can be understood as a group of members that can be treated identically for confidentiality purposes. A scope can either be a single node (e.g., a single department), or it can be a node and all of that node's descendent nodes. A descendent node of node X can be a child node of node X or a descendent node of one of node X's child nodes. An ancestor node of node X can be the parent of node X or an ancestor node of node X's parent node.

When a respondent's response is expired or recreated, this can be referred to as response invalidation. When a response is invalidated, it is no longer available for the respondent to review. Thus, while not shown in FIG. 6, the recreated responses will appear to the members of the safe groups that their responses disappeared. If the topic is still active, the respondent can provide a new response, and can be prompted to do so. If a respondent provides a new response, any previously recreated response for that survey take is immediately expired.

Figure 7:
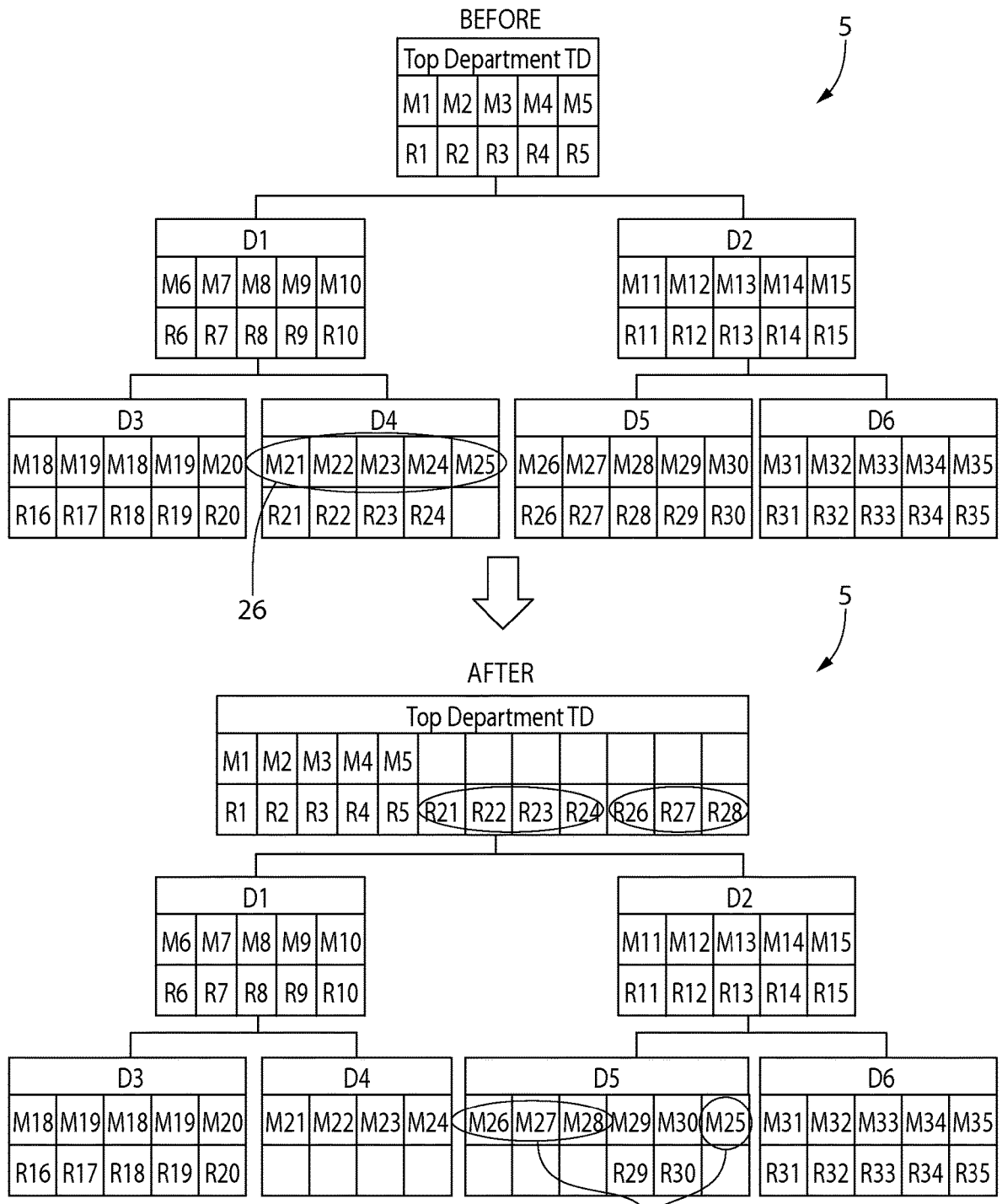
FIG. 7 is a block diagram of a hierarchy before and after a non-responding member moves laterally within an organization according to one embodiment of the present invention.

FIG. 7 is a block diagram of a hierarchy 5 before and after a non-responding member M25 moves laterally within an organization according to one embodiment of the present invention. The hierarchy 5 before the lateral movement is similar to that of FIG. 4, but with additional members in department D6 and additional responses. In this embodiment, first member M25 moves from first department D4 to second department D5. First department D4 includes respondents M21-M24 (the first department respondents) and second department D5 includes respondents M26-M30 (the second department respondents).

But unlike FIG. 6, the first member M25 moving laterally did not provide a response to the survey topic (there is no R25), and therefore the first member M25 is not among the first department respondents M21-M24. As a result, the first safe group 26 does not include first member M25. Rather, since the safe group size is four, the safe group includes M21-M24. Thus, responses R21-R24 are expired after the organizational change.

As for the second safe group 66, even though the first member M25 is not a respondent to the survey topic, the first member M25 is included as part of the second safe group, along with M26-M28, to reach a size of four. Thus, responses M26-M28 are expired. In other embodiments, a safe group can be defined such that a non-responding member like M25 is not included as one of the second safe group members, or a safe group can include or exclude the first member regardless of whether the first member was a respondent.

FIG. 7 also differs from FIG. 6 in that the first department D4 reports to department D1, while the second department D5 reports to department D2. This impacts where the expired responses are recreated. In this embodiment (as in FIG. 6), when members move laterally within an organizational hierarchy, the safe group responses are recreated in the nearest common ancestor scope (NCAS). For a lateral organizational change, the NCAS is the deepest scope in the hierarchy that includes both the original department (source scope) and the new department (target scope) as descendants. In the current example, department D1 does not include department D5 as a descendent, and department D2 does not include department D4 as a descendant. Thus, the NCAS is top department TD. The safe group responses R21-R24 and R26-R28 are recreated in top department TD because this department will have the same hierarchical membership, and therefore its response reports need not be impacted by the organizational change.

Figure 8:
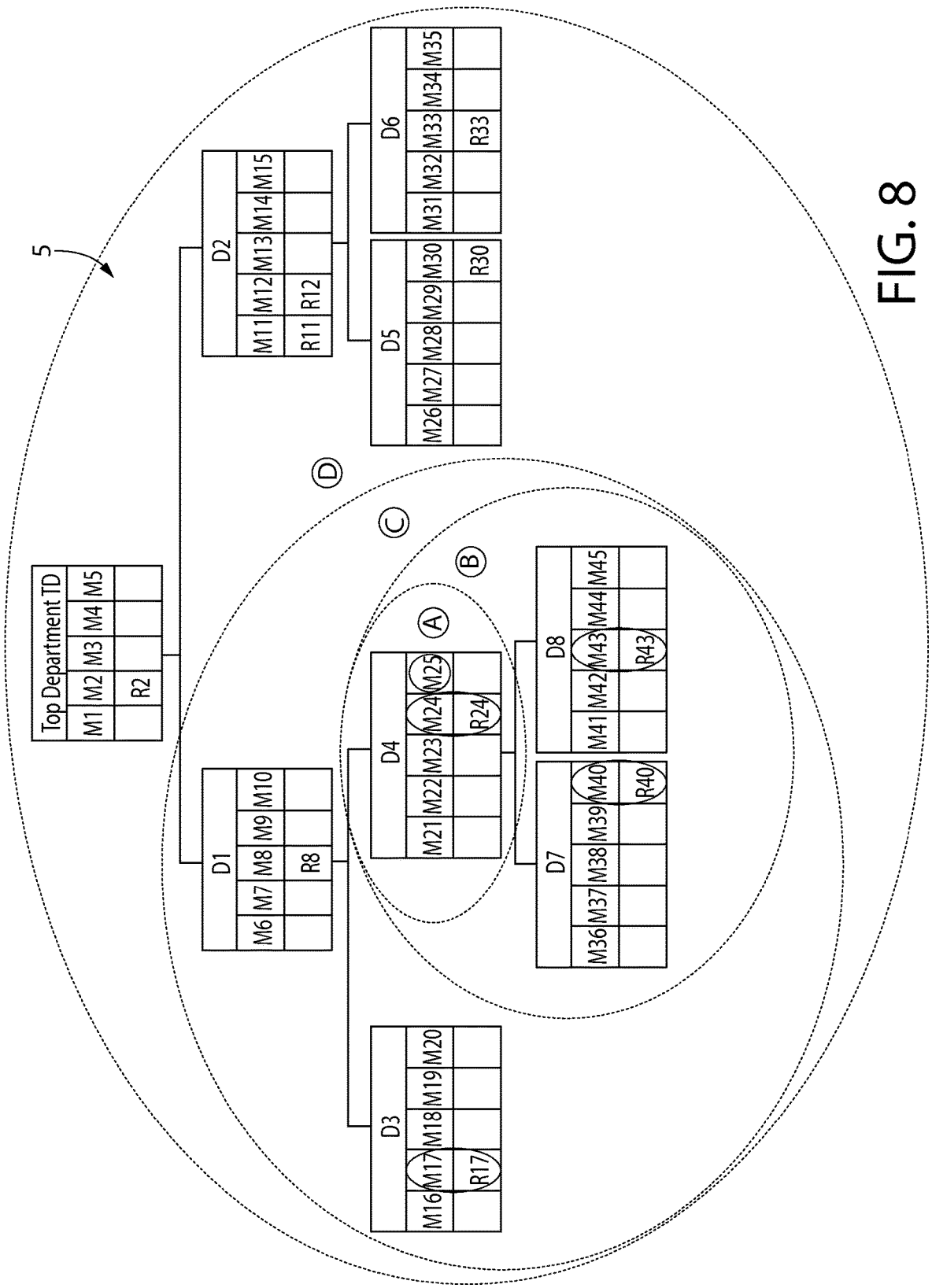
FIG. 8 is a block diagram of a hierarchy according to one embodiment of the present invention.

FIG. 8 is a block diagram of a hierarchy according to one embodiment of the present invention. In this embodiment, first member M25 is leaving the organization. This figure differs from previous figures in that there are an insufficient number of respondents in the first department D4 to create a four-respondent safe group. Rather, there is only one respondent, M24, in the first department D4, also referred to as scope A. To create a safe group of four, there must be three additional respondents from other departments whose responses are expired. To do this, the system looks to the next scope, scope B, for additional respondents. There, it finds M40 and M43. Since the safe group still needs one additional respondent, the system looks to the next scope, scope C, for additional respondents. There, it finds M8 and M17. The system must choose one of their responses, R8 or R17, to expire. In the exemplified embodiment, the system expires response R17, because R17 is the older response (R8 was provided more recently). If the safe group required yet further respondents, it would expand it search to scope D. In other embodiments, other approaches can be used for determining which member responses to expire.

Figure 9:
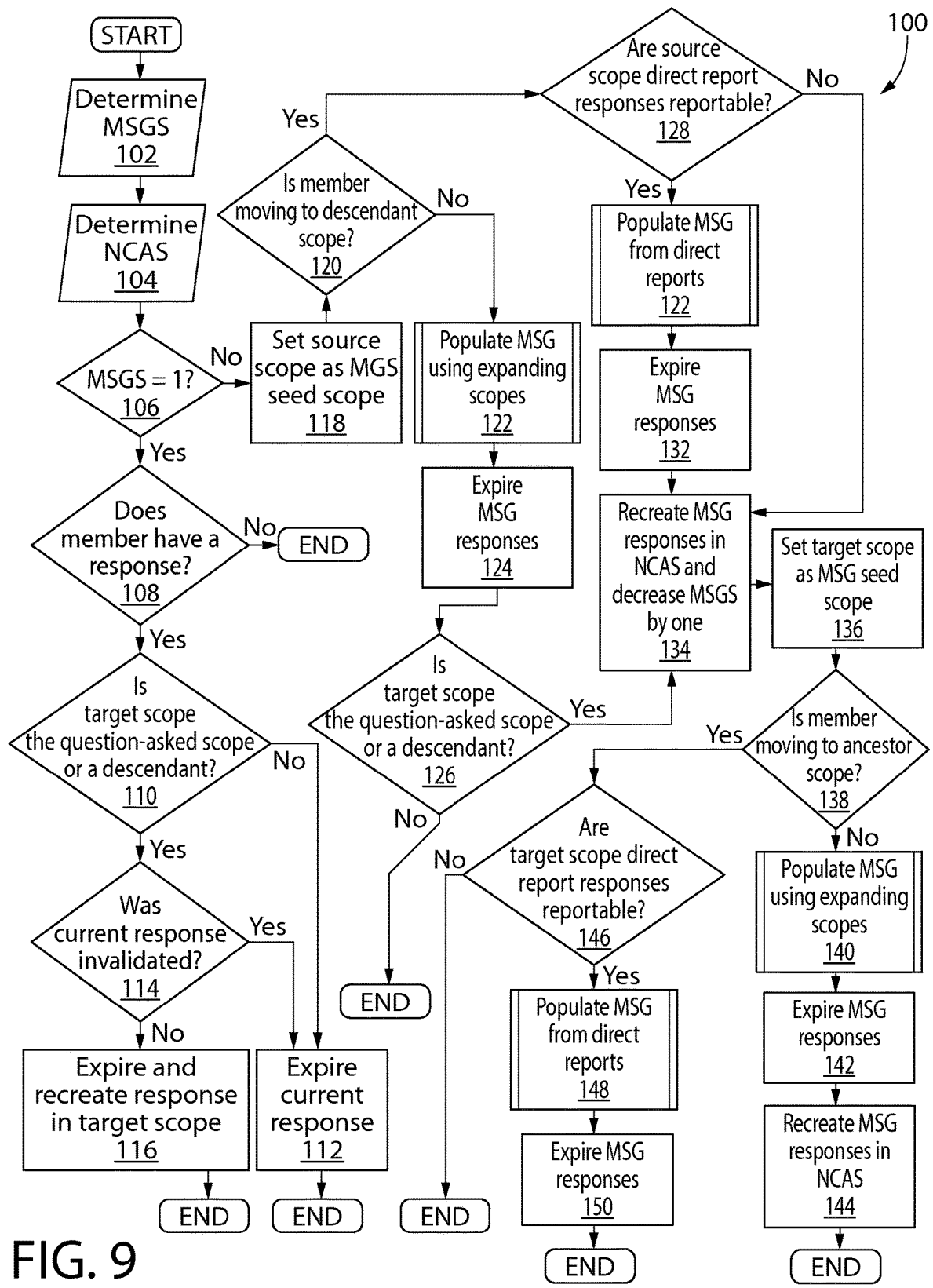
FIG. 9 is a flow chart of a method where a member moves within a hierarchy according to one embodiment of the invention.

FIG. 9 is a flow chart of a process 100 where a member moves laterally within a hierarchy from a first department (source scope) to a second department (target scope) according to one embodiment of the invention. First, the process determines the minimum safe group size (MSGS) (step 102). This number can be provided by the first member, be predetermined, or otherwise be determined. Next, the process determines the nearest common ancestor scope (NCAS) for the source scope and the target scope (step 104). Next, the process determines whether the MSGS is equal to one (step 106).

If the MSGS is equal to one, the process determines whether the first member has a response (step 108). If not, the process ends. If so, the process determines whether the target scope is the topic-asked scope or a descendent (step 110). If not, the current response is expired (step 112) and the process ends. If so, the process determines whether the current response was invalidated (step 114). If so, the current response is expired (step 112) and the process ends. If not, the response is expired and recreated in the target scope (step 116) and the process ends.

If the MSGS does not equal one, the source scope is set as the initial scope to consider as a potential MSG (the seed scope) (step 118). Next, the process determines whether the first member is moving to a descendant scope (step 120). If not, the MSG is populated by using expanding scopes, that is, by looking at successive parent scopes until a scope is found with the MSGS or greater (step 122), and the MSG responses are expired (step 124). Next, the process determines whether the target scope is the topic-asked scope or a descendant (step 126). If not, the process ends. If so, the process moves to step 134 (discussed below).

If the first member is moving to a descendant scope (step 120), the process determines whether the source scope direct report responses are reportable (step 128). If so, the MSG is populated from direct reports (step 130), the MSG responses are expired (step 132), and the MSG responses are recreated in NCAS and the MSGS (minimum safe group size) is decreased by one (step 134). Step 134 also occurs if the source scope direct report responses are not reportable.

Next, the target scope is set as the initial scope to consider as a potential MSG (the seed scope) (step 136). Next, the process determines whether the member is moving to an ancestor scope (step 138). If not, the MSG is populated by looking at successive parent scopes until a scope is found with the MSGS or greater (step 140), the MSG responses are expired (step 142), and the MSG responses re recreated in the NCAS (step 144).

If in step 138 it is determined that the first member is moving to an ancestor scope, the process determines whether the target scope direct report responses are reportable (step 146). If not, the process ends. If so, the MSG is populated from direct reports (step 148), the MSG responses are expired (step 150), and the process ends.

Figure 10:
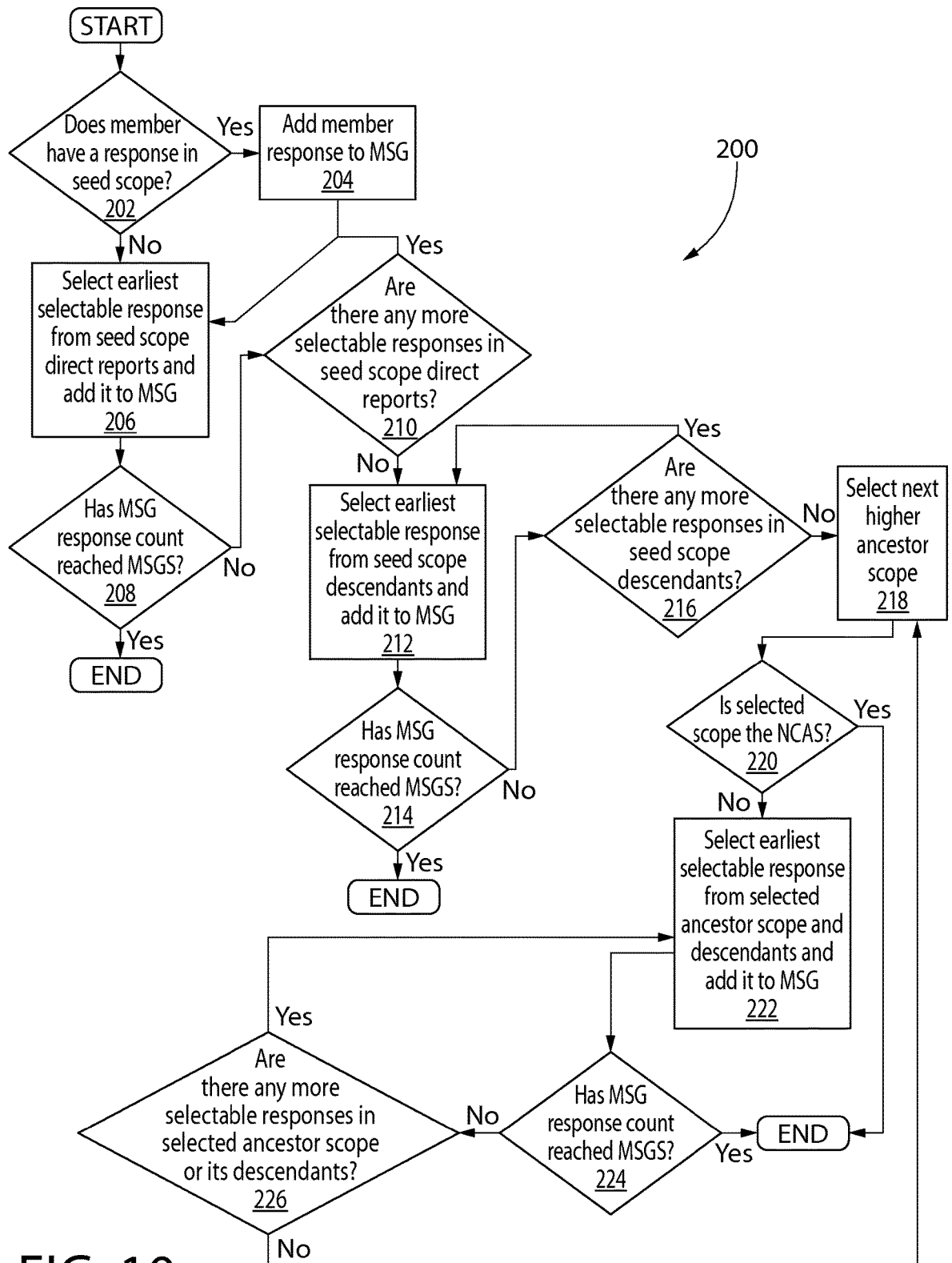
FIG. 10 is a flow chart of a method for populating a safe group using expanding scopes according to one embodiment of the invention.

FIG. 10 is a flow chart of a process 200 for populating a safe group using expanding scopes according to one embodiment of the invention. First, the process determines whether the first member has a response in a seed scope (step 202). If so, the process adds a member response to the MSG (step 204) and then selects the earliest selectable response from the seed scope direct reports and adds it to the MSG (step 206). A selectable response is one that was not already added to the MSG, and was not provided by a leader initiating the current organizational change. Step 206 is also carried out if the first member does not have a response in the seed scope.

Next, the process determines whether the MSG response count has reached the MSGS (step 208). If so, the process ends. If not, the process determines whether there are any more selectable responses in the seed scope direct reports (step 210). If so, the process returns to step 206. If not, the process selects the earliest selectable response from the seed scope descendants and adds it to the MSG (step 212) and determines whether the MSG response count has reached the MSGS (step 214). If so, the process ends. If not, the process determines whether there are any more selectable responses in the seed scope descendants (step 216). If so, the process returns to step 212.

If not, the process selects the next higher ancestor scope (step 218) and determines whether the selected scope is the NCAS (step 220). If so, the process ends. If not, the process selects the earliest selectable response from the selected ancestor scope and descendants and adds it to the MSG (step 222). Next, the process determines whether the MSG response count reached the MSGS (step 224). If so, the process ends. If not, the process determines whether there are any more selectable responses in the selected ancestor scope or its descendants (step 226). If so, the process returns to step 222. If not, the process returns to step 218.

Figure 11:
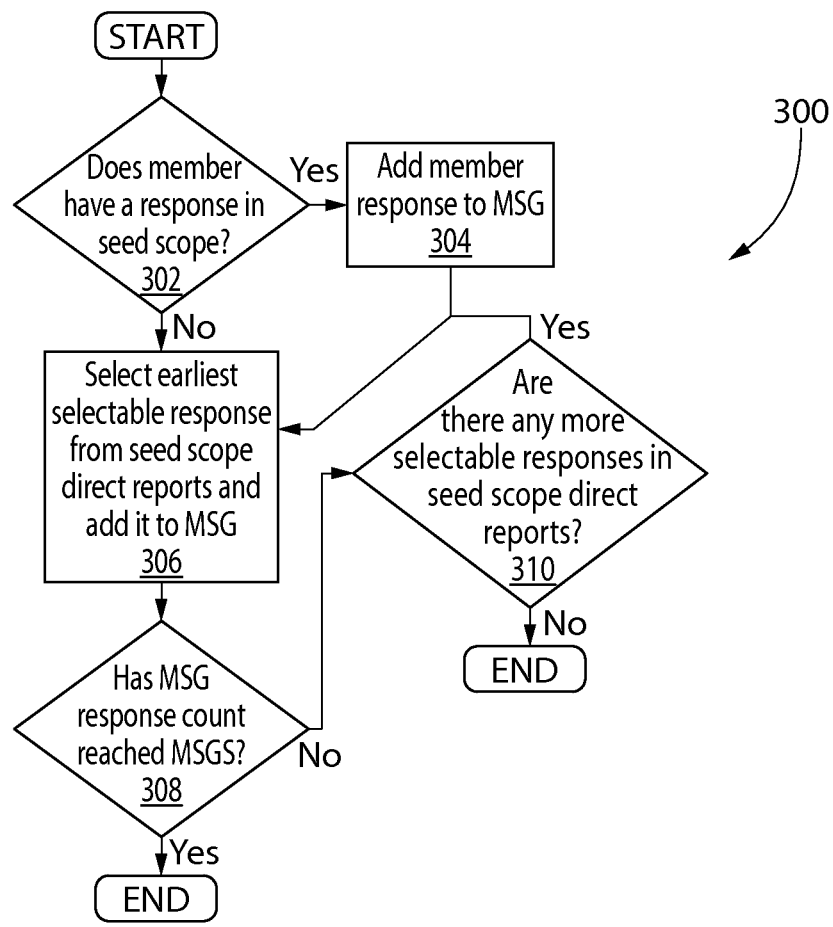
FIG. 11 is a flow chart of a method for populating a safe group from direct reports according to one embodiment of the invention.

FIG. 11 is a flow chart of a process 300 for populating a safe group from direct reports according to one embodiment of the invention. First, the process determines whether the first member has a response in the seed scope (step 302). If so, the process adds a member response to the MSG (step 304) and then selects the earliest selectable response from the seed scope direct reports and adds it to the MSG (step 306). A selectable response is one that was not already added to the MSG, and was not provided by a leader initiating the current organizational change. Step 306 is also carried out if the first member does not have a response in the seed scope.

Next, the process determines whether the MSG response count has reached the MSGS (step 308). If so, the process ends. If not, the process determines whether there are any more selectable responses in the seed scope direct reports (step 310). If so, the process returns to step 306. If not, the process ends.

It is noted that the foregoing discussions concern organizational changes for a single survey topic. It is understood that there could be multiple active survey topics, and each topic can have its own set of responses scattered throughout the hierarchy. The confidentiality system can be designed to ensure that a member's responses (or non-responses) are protected for every topic that was asked in the member's department. The confidentiality operations described above can be performed simultaneously using a standard database technique.

While the invention been described with respect to specific examples, those skilled in the art will appreciate that there are numerous variations and permutations of the above described invention. It is to be understood that other embodiments may be utilized and structural and functional modifications may be made without departing from the scope of the present invention. Thus, the spirit and scope should be construed broadly as set forth in the appended claims.

What is claimed is:

1. A method of protecting confidentiality in a real-time survey, the method comprising:
receiving, at a server, from respondent devices of each of a plurality of organization respondents, a real-time response to a survey topic, the response chosen from different survey response options, wherein each of the respondent devices is configured to execute a first instance of a servey application, and the first instance of the survey application is configured to receive the real-time respnses via a graphical user interface of the respondent device that displays each of the survey response options, wherein the graphical user interface comprises a screen for receiving a selection of a level of confidentiality desired;
receiving, at the server, an indication of an organizational change affecting a first member of the organization, the organizational change coprising the first member departing or joining a first department, the first department comprising a plurality of first department respondents; the plurality of first department respondents being a first subset of the plurality of organization respondents;
in response to the receiving of the indication of the organizational change, defining in real-time, at the server, a first safe group comprising a first subset of the plurality of first department respondents, the first safe group having first safe group responses to the survey topic; and
transmitting, by a server, a response report for at least the first department to a graphical user nterface of a manager device utilizing a second instance of the survey application;
wherein the response report provides a summary of the survey responses to the survey topic, wherein the summary is based on, for each of the survey response options, a total number of the survey responses corresponding to the survey response option; and defining a first safe group comprising a first subset of the plurality of first department respondents, the first safe group having first safe group responses to the survey topic; and
wherein the total number of the survey response for each of the survey response options, in response to the selecton of the level of confidentiality desired, excludes the first safe group responses to the survey topic and thereby prevents the departing or joining of the first member from solely causing a change to the summary of the survey responses from a summary of the survey responses of a previous response report.

2. The method of claim 1 wherein the organization change comprises the first member leaving the first department and joining a second department, the second department comprising a plurality of second department respondents, the plurality of second department respondents being a second subset of the plurality of organization respondents, the method further comprising:
defining a second safe group comprising a second subset of the plurality of second department respondents, the second safe group having second safe group responses to the survey topic; and
providing a response report for at least the second department, the response report excluding the second safe group responses.

3. The method of claim 2 further comprising providing a second response report that includes both the first department and the second department, the second response report not excluding the first safe group responses or the second safe group responses.

4. The method of claim 2 wherein:
the first member is one of the plurality of organization respondents; and
the first safe group or the second safe group further comprises the first member.

5. The method of claim 2 further comprising prompting each respondent of the first safe group and each respondent of the second safe group to provide a new response to the survey topic.

6. The method of claim 2 wherein the first safe group comprises a first predetermined number of respondents, and wherein the second safe group comprises a second predetermined number of respondents.

7. The method of claim 6 wherein the first member chooses the first predetermined number, and the first predetermined number is equal to the second predetermined number.

8. The method of claim 5 wherein the first safe group responses and the second safe group responses are included in response reports that include both the first department and the second department until replaced by new responses.

9. The method of claim 1 wherein the first safe group further comprises organization respondents that do not belong to the first department.

10. The method of claim 1 wherein the first member is not one of the plurality of organization respondents and the first safe group does not comprise the first member.

11. The method of claim 1 wherein there are four first safe group responses.

12. The method of claim 1 further comprising, prior to the indication of the organizational change, receiving from the first member an indication of general concern for confidentiality, the exclusion of the first safe group responses being conditioned on the indication of general concern for confidentiality.

13. The method of claim 1 wherein the steps of defining the first safe group and excluding the first safe group responses are also carried out when a password of the first member is reset.

14. The medium of claim 1 wherein the summary of the survey responses provides an area for each survey response option, the area corresponding to, for each of the survey response options, the total number of the survey responses corresponding to the survey response option.

15. A system comprising:
   a) respondent devices of first department respondents to a survey topic, wherein:
      i) each of the first department respondents belongs to a first department;
      ii) each of the respondent devices is configured to execute a first instance of a survey application; and
      iii) the first instance of the survey application is configured to receive from each of the first department respondents a real-time response to the survey topic via a graphical user interface of the respondent device, wherein the response is chosen from different survey response options, and wherein the graphical user interface comprises a screen that displays each of the survey response options and receives a selection of a level of confidentiality desired;
   b) a first member device of a first member of the first department;
   c) a manager device of a manager of the first department; and
   d) a server configured to:
      i) receive an indication of an organizational change affecting the first member, the organizational change comprising the first member departing the first department;
      ii) in response to the receipt of the indication of the organizational change, define in real-time a safe group comprising a subset of the first department respondents, the safe group having safe group responses to the survey topic; and
      iii) transmit a response report for at least the first department to a graphical user interface of a manager device utilizing a second instance of the survey application;
   wherein the response report provides a summary of the survey responses to the survey topic, wherein the summary is based on, for each of the survey response options, a total number of the survey responses corresponding to the survey response option; and,
   wherein the total number of the survey response for each of the survey response options, in response to the selection of the level of confidentiality desired, excludes the first safe group responses to the survey topic and thereby prevents the departing or joining of the first member from solely causing a change to the summary of the survey responses from a summary of the survey responses of a previous response report.

16. A non-transitory computer-readable storage medium encoded with instructions which, when executed on a processor, perform a method of:
   receiving, at a server, from respondent devices of each of a plurality of organization respondents, a real-time response to a survey topic, the response chosen from different survey response options, wherein each of the respondent devices is configured to execute a first instance of a survey application, and the first instance of the survey application is configured to receive the real-time responses via a graphical user interface of the respondent device that displays each of the survey response options, wherein the graphical user interface comprises a screen for receiveing a selection of a level of confidentiality desired;
   receiving, at the server, an indication of an organizational change affecting a first member of the organization, the organiational change comprising the first member departing or joining a first department, the first department comprising a plurality of first department respondents, the plurality of first department respondents being a first subset of the plurality of organization respondents;
   in response to the receiving of the indication of the organizational change, defining in real-time a first safe group comprising a first subset of the plurality of first department respondents, the first safe group having first safe group responses to the survey topic; and
   transmitting, by the server, a response report for at least the first department to a graphical user interface of a manager device utilizing a second instance of the survey application;
   wherein the response report provides a summary of the survey responses to the survey topic, wherein the summary is based on, for each of the survey response options, a total number of the survey responses corresponding to the survey response option; and
   wherein the total number of the survey response for each of the survey response options, in response to the selection of the level of confidentiality desired, ecludes the first safe group responses to the survey topic and thereby prevents the departing or joining of the first member from solely causing a change to the summary of the survey responses from a summary of the survey respoinses of a previous response report.

17. The medium of claim 16 wherein the organization change comprises the first member leaving the first department and joining a second department, the second department comprising a plurality of second department respondents, the plurality of second department respondents being a second subset of the plurality of organization respondents, wherein the method
   defining a second safe group comprising a second subset of the plurality of second department respondents, the second safe group having second safe group responses to the survey topic; and
   providing a response report for at least the second department, the response report excluding the second safe group responses.

18. The medium of claim 17 wherein the method performed further comprises providing a response report that includes both the first department and the second department, the response report not excluding the first safe group responses or the second safe group responses.

19. The medium of claim 17 wherein:
- the first member is one of the plurality of organization respondents; and
- the first safe group or the second safe group further comprises the first member.

20. The medium of claim 16 wherein the first safe group further comprises organization respondents that do not belong to the first department.

\* \* \* \* \*